United States Patent [19]
Ohtani et al.

[11] Patent Number: 5,441,656
[45] Date of Patent: * Aug. 15, 1995

[54] AUTOMATIC TRANSMISSION FLUIDS AND ADDITIVES THEREFOR

[75] Inventors: Hiroko Ohtani, Sapporo, Japan; Rolfe J. Hartley, Glen Allen, Va.

[73] Assignee: Ethyl Petroleum Additives, Inc., Richmond, Va.

[*] Notice: The portion of the term of this patent subsequent to Dec. 13, 2011 has been disclaimed.

[21] Appl. No.: 236,524

[22] Filed: Jul. 25, 1994

Related U.S. Application Data

[63] Continuation-in-part of Ser. No. 195,860, Feb. 10, 1994, Pat. No. 5,372,735.

[51] Int. Cl.$^6$ .......................................... C10M 133/04
[52] U.S. Cl. .......................................... 252/51.5 R
[58] Field of Search .................................. 252/51.5 R

[56] References Cited

U.S. PATENT DOCUMENTS

| | | | |
|---|---|---|---|
| 3,625,988 | 12/1971 | Cyba | 252/50 |
| 3,668,236 | 6/1972 | Cyba | 252/49.6 |
| 5,348,670 | 9/1994 | McDonald et al. | 252/50 |

Primary Examiner—Jacqueline V. Howard
Attorney, Agent, or Firm—Dennis H. Rainear; William H. Thrower

[57] ABSTRACT

An effective way is described for overcoming the shudder problem associated with continuous slip torque converter clutches for use in automatic transmissions, especially shudder which occurs with new friction materials before break-in. To do this, an ATF is used in which the friction modifier system consists essentially of (i) an N-aliphatic hydrocarbyl-substituted diethanolamine in which the N-aliphatic hydrocarbyl-substituent is at least one straight chain aliphatic hydrocarbyl group free of acetylenic unsaturation and having in the range of 14 to 20 carbon atoms, and (ii) an N-aliphatic hydrocarbyl-substituted trimethylenediamine in which the N-aliphatic hydrocarbyl-substituent is at least one straight chain aliphatic hydrocarbyl group free of acetylenic unsaturation and having in the range of about 14 to about 20 carbon atoms. The ATF is devoid of any tertiary amine friction modifier component and any $C_{12-36}$ aliphatic hydrocarbyl succinimide or succinamide friction modifier. Specified relative proportions and concentrations of (i) to (ii) are used.

27 Claims, 1 Drawing Sheet

AUTOMATIC TRANSMISSION FLUIDS AND ADDITIVES THEREFOR

REFERENCE TO RELATED APPLICATION

This application is a continuation-in-part of prior application Ser. No. 08/195,860, filed Feb. 10, 1994, now U.S. Pat. No. 5,372,735.

TECHNICAL FIELD

This invention relates to improving the performance of automatic transmission fluids.

BACKGROUND

There is worldwide activity by the automobile manufacturers to develop automatic transmissions incorporating various continuous slip torque converter clutch (CSTCC) designs. These developments are being driven by the anticipated increase in Corporate Average Fuel Economy (CAFE) requirements in the U.S.A. The CSTCC design allows increases in fuel economy to be gained with minimal mechanical modifications to the transmission.

One of the barriers to successful implementation of the continuous slip torque converter clutch design for automatic transmissions is transmission shudder. An important factor contributing to shudder is the frictional characteristics of the automatic transmission fluid (ATF). Shudder is undesirable for the durability and operability of the equipment and can result in customer complaints and increased warranty costs. As a result, many original equipment manufacturers are looking for automatic transmission fluids with frictional characteristics capable of meeting the requirements of CSTCC designs.

The torque converter is located between the engine and transmission in an automatic transmission. It functions as a engine torque multiplier and a mechanism to transmit engine power by fluid coupling. Most of the recent transmission torque converters are equipped with lock-up clutches (or centrifugal bypass clutches). Lock-up clutches are engaged at highway speeds to reduce the energy loss due to pump/turbine inefficiencies. Further improvements in fuel economy can be achieved if the lock-up clutches are engaged at lower driving speeds. However, it is not possible to dampen the power fluctuations from the engine at low driving speeds if the lock-up clutches are completely engaged. In a CSTCC, the lock-up clutch continuously slips while engaged at lower driving speeds and can be locked up (without slippage) at highway speeds. (The terminology "continuous slip torque converter clutch" is terminology that has developed in the art, but it must be kept in mind that in spite of this terminology, the continuously slipping clutches are not necessarily slipping all of the time.) The CSTCC design not only reduces the energy losses associated with complete fluid coupling, but also allows power fluctuations to be smoothed. A vehicle equipped with a CSTCC is expected to have better fuel efficiency by approximately 10% compared to that for a conventional lock-up torque converter design transmission.

Vehicles equipped with CSTCC transmissions often suffer from the undesirable phenomenon of shudder or self-excited vibration. This vibration is believed to be caused by a "stick-slip" phenomenon, in which two surfaces alternately stick together and slip over each other; two surfaces stick when the lateral force is not great enough to overcome the frictional force and they break loose when the lateral force builds up enough to overcome frictional forces. This oscillatory motion results in periodic vibrations characterized as squawk, shudder, or chatter. Stick-slip is most frequently observed at low sliding speeds and particularly when the coefficient of friction increases with decreasing sliding speed.

From a customer satisfaction view point, it is extremely important that the vehicle does not shudder at any point in its lifetime. OEM data show that shudder is more severe with new friction materials than after the materials are broken in. This means that for factory fill applications, the ATF must show good initial shudder performance before break-in as well as after break-in.

A need therefore exists for an effective way of overcoming the shudder problem associated with the continuous slip torque converter clutches for use in automatic transmissions, especially shudder which occurs with new friction materials before break-in. In fulfilling this need it is also important to ensure that the frictional characteristics needed in the automatic transmission fluid do not materially change with respect to time.

This invention overcomes the shudder problem by providing a friction modifier system that exhibits good anti-shudder performance both initially before break-in as well as after break-in. Moreover these performance advantages are achieved without material change in friction properties over time. Therefore, this invention now makes it possible for the original equipment manufacturers (OEMs) to make effective use of CSTCC designs in automatic transmissions in order to achieve the benefits made possible by such designs. And, as those skilled in the art can readily appreciate, there was no way by which the advantages of this invention could have been foreseen prior to the successful conduct of the experimental test work on this invention.

SUMMARY OF THE INVENTION

In accordance with this invention there is provided, in one of its embodiments, an automatic transmission fluid (ATF) which has a friction modifier content, said automatic transmission fluid being characterized in that:
a) the friction modifier content of said automatic transmission fluid consists essentially of (i) an N-aliphatic hydrocarbyl-substituted diethanolamine in which the N-aliphatic hydrocarbyl-substituent is at least one straight chain aliphatic hydrocarbyl group free of acetylenic unsaturation and having in the range of 14 to 20 carbon atoms, and (ii) an N-aliphatic hydrocarbyl-substituted trimethylenediamine in which the N-aliphatic hydrocarbyl-substituent is at least one straight chain aliphatic hydrocarbyl group having in the range of about 14 to about 20 carbon atoms;
b) the friction modifier is devoid of any tertiary amine friction modifier component and any $C_{12-36}$ aliphatic hydrocarbyl succinimide or succinamide;
c) the relative proportions of (i) to (ii) are such that there are from about 7 to about 340 parts by weight of (i) per part by weight of (ii); and
d) the automatic transmission fluid contains 0.08 to 0.17 wt % of (i) and 0.0005 to 0.02 wt % of (ii) proportioned as in c) hereof.

Typically the proportions of (i) to (ii) are such that there are from about 7 to about 160 parts by weight of (i) per part by weight of (ii). In preferred embodiments, this ratio is such that there are about 7 to about 70, and more preferably about 7 to about 40 parts by weight of (i) per part by weight of (ii). In most cases the concentration of component (ii) in the ATF will fall in the range of 0.001 to 0.02, and typically in the range of 0.002 to 0.02. Preferably, the concentration of (ii) in the ATF is in the range of 0.003 to 0.02 and, more preferably, in the range of 0.005 to 0.02.

Particularly preferred relative proportions of (i) to (ii) are such that there are from about 7.5 to about 30 parts by weight of (i) per part by weight of (ii). Especially preferred compositions have from about 15 to about 30 parts by weight of (i) per part by weight of (ii).

Other embodiments of this invention will become apparent from the ensuing description and appended claims.

FURTHER DESCRIPTION

Among the important features of this invention is that the friction modifier content of the automatic transmission fluid must "consist essentially of" the pair of components specified hereinabove. By "consists essentially of" is meant that no other friction modifier component can be present that would adversely affect the novel and beneficial properties afforded by the specified pair of components (i) and (ii). In other words, additional friction modifier, if present, must not adversely affect the novel and beneficial properties afforded by the specified pair of components (i) and (ii). Another important feature of this invention is that the above specified proportions and concentrations should be carefully observed, inasmuch as material departures therefrom can result in substantial loss of the benefits achievable by the practice of this invention.

As specified above, the compositions of the present invention are devoid of any tertiary amine friction modifier component such as the aliphatic tertiary amines described in U.S. Pat. No. 4,795,583. The compositions of this invention are likewise devoid of any $C_{12-36}$ aliphatic hydrocarbyl succinimide or succinamide friction modifier such as are described in European Patent Application Publication No. 20,037. On the other hand, at least certain sulfurized fatty ester type friction modifiers can be used in the compositions of this invention without adverse consequences.

Component (i) is a small family of compounds which differ only in the precise identity of the aliphatic hydrocarbyl-substituent bonded to the nitrogen atom. These aliphatic substituents contain in the range of 14 to 20 carbon atoms, and are free from acetylenic unsaturation. Thus, these substituents are either saturated or olefinically unsaturated usually by no more than three olefinic double bonds. Component (i) can be an individual compound or a mixture of compounds. In this connection, it is well known that the range of 14 to 20 carbon atoms is typical of aliphatic substituents found in fatty acids. Preferred for use as component (i) is N-tallow diethanolamine. In this component "tallow" corresponds to the hydrocarbyl substituents derivable from tallow acids. One commercially available material of this type is identified by the trade designation Ethomeen T-12 from Akzo Chemical Company. Other compounds of this family include N-myristyl diethanolamine, N-cetyl diethanolamine, N-stearyl diethanolamine and N-oleyl diethanolamine.

Component (ii) is an N-aliphatic hydrocarbyl-substituted trimethylenediamine in which the N-aliphatic hydrocarbyl-substituent is at least one straight chain aliphatic hydrocarbyl group free of acetylenic unsaturation and having in the range of about 14 to about 20 carbon atoms. Component (ii) can be a single compound or a mixture of compounds. Here again, the only difference among the compounds is the makeup of the particular hydrocarbyl substituent which falls in the above referred to small family of saturated or olefinically unsaturated aliphatic groups characteristic of fatty chemicals. A preferred compound for use as component (ii) is N-oleyl-trimethylene diamine. This product is available on the market under the trade designation Duomeen-O from Akzo Chemical Company. Other suitable compounds include N-tallow-trimethylene diamine (Duomeen-T) and N-coco-trimethylene diamine (Duomeen-C).

The base oils used in forming the automatic transmission fluids of this invention can be any suitable natural or synthetic oil having the necessary viscosity properties for this usage. Thus, the base oil may be composed entirely of a natural oil such as mineral oil of suitable viscosity or it may be composed entirely of a synthetic oil such as a poly-alpha-olefin oligomer of suitable viscosity. Likewise, the base oil may be a blend of natural and synthetic base oils provided that the blend has the requisite properties for use in the formation of an automatic transmission fluid. Ordinarily, the base oil should have a kinematic viscosity in the range of 3 to 8 centistokes (cSt) at 100° C. Preferred automatic transmission fluids used in the practice of this invention are formulated so as to possess a kinematic viscosity of at least 6.8 cSt at 100° C. and a Brookfield viscosity of no more than 20,000 cP at −40° C.

Automatic transmission fluids normally contain in addition to a friction modifier system, one or more antiwear/extreme pressure additives, one or more oxidation inhibitors, one or more rust inhibitors, one or more copper corrosion inhibitors, one or more foam inhibitors and a viscosity index improver. The automatic transmission fluids may also contain a seal swell agent and a dye.

Preferably the compositions of this invention contain at least one oil-soluble phosphorus-containing ashless dispersant present in amount such that the ratio of phosphorus in said ashless dispersant to said component (i) is in the range of about 0.1 to about 0.4 part by weight of phosphorus per part by weight of component (i); and/or at least one oil-soluble boron-containing ashless dispersant present in amount such that the ratio of boron in said ashless dispersant to said component (i) is in the range of about 0.05 to about 0.2 part by weight of boron per part by weight of component (i). Most preferably, the compositions of this invention contain at least one oil-soluble phosphorus- and boron-containing ashless dispersant present in amount such that the ratio of phosphorus in said ashless dispersant to said component (i) is in the range of about 0.15 to about 0.3 part by weight of phosphorus per part by weight of component (i), and such that the ratio of boron in said ashless dispersant to said component (i) is in the range of about 0.05 to about 0.15 part by weight of boron per part by weight of component (i).

The foregoing phosphorus- and/or boron-containing ashless dispersants can be formed by phosphorylating and/or boronating a ashless dispersant having basic nitrogen and/or at least one hydroxyl group in the molecule, such as a succinimide dispersant, succinic ester dispersant, succinic ester-amide dispersant, Mannich base dispersant, hydrocarbyl polyamine dispersant, or polymeric polyamine dispersant.

The polyamine succinimides in which the succinic group contains a hydrocarbyl substituent containing at least 30 carbon atoms are described for example in U.S. Pat. Nos. 3,172,892; 3,202,678; 3,216,936; 3,219,666; 3,254,025; 3,272,746; and 4,234,435. The alkenyl succinimides may be formed by conventional methods such as by heating an alkenyl succinic anhydride, acid, acid-ester, acid halide, or lower alkyl ester with a polyamine containing at least one primary amino group. The alkenyl succinic anhydride may be made readily by heating a mixture of olefin and maleic anhydride to about 180°–220° C. The olefin is preferably a polymer or copolymer of a lower monoolefin such as ethylene, propylene, 1-butene, isobutene and the like. The more preferred source of alkenyl group is from polyisobutene having a GPC number average molecular weight of up to 10,000 or higher, preferably in the range of about 500 to about 2,500, and most preferably in the range of about 800 to about 1,200.

As used herein the term "succinimide" is meant to encompass the completed reaction product from reaction between one or more polyamine reactants and a hydrocarbon-substituted succinic acid or anhydride (or like succinic acylating agent), and is intended to encompass compounds wherein the product may have amide, amidine, and/or salt linkages in addition to the imide linkage of the type that results from the reaction of a primary amino group and an anhydride moiety.

Alkenyl succinic acid esters and diesters of polyhydric alcohols containing 2–20 carbon atoms and 2–6 hydroxyl groups can be used in forming the phosphorus- and/or boron-containing ashless dispersants. Representative examples are described in U.S. Pat. Nos. 3,331,776; 3,381,022; and 3,522,179. The alkenyl succinic portion of these esters corresponds to the alkenyl succinic portion of the succinimides described above.

Suitable alkenyl succinic ester-amides for forming the phosphorylated and/or boronated ashless dispersant are described for example in U.S. Pat. Nos. 3,184,474; 3,576,743; 3,632,511; 3,804,763; 3,836,471; 3,862,981; 3,936,480; 3,948,800; 3,950,341; 3,957,854; 3,957,855; 3,991,098; 4,071,548; and 4,173,540.

Hydrocarbyl polyamine dispersants that can be phosphorylated and/or boronated are generally produced by reacting an aliphatic or alicyclic halide (or mixture thereof) containing an average of at least about 40 carbon atoms with one or more amines, preferably polyalkylene polyamines. Examples of such hydrocarbyl polyamine dispersants are described in U.S. Pat. Nos. 3,275,554; 3,394,576; 3,438,757; 3,454,555; 3,565,804; 3,671,511; and 3,821,302.

In general, the hydrocarbyl-substituted polyamines are high molecular weight hydrocarbyl-N-substituted polyamines containing basic nitrogen in the molecule. The hydrocarbyl group typically has a number average molecular weight in the range of about 750 10,000, more usually in the range of about 1,000–5,000, and is derived from a suitable polyolefin. Preferred hydrocarbyl-substituted amines or polyamines are prepared from polyisobutenyl chlorides and polyamines having from 2 to about 12 amine nitrogen atoms and from 2 to about 40 carbon atoms.

Mannich polyamine dispersants which can be utilized in forming the phosphorylated and/or boronated ashless dispersant is a reaction product of an alkyl phenol, typically having a long chain alkyl substituent on the ring, with one or more aliphatic aldehydes containing from 1 to about 7 carbon atoms (especially formaldehyde and derivatives thereof), and polyamines (especially polyalkylene polyamines). Examples of Mannich condensation products, and methods for their production are described in U.S. Pat. Nos. 2,459,112; 2,962,442; 2,984,550; 3,036,003; 3,166,516; 3,236,770; 3,368,972; 3,413,347; 3,442,808; 3,448,047; 3,454,497; 3,459,661; 3,493,520; 3,539,633; 3,558,743; 3,586,629; 3,591,598; 3,600,372; 3,634,515; 3,649,229; 3,697,574; 3,703,536; 3,704,308; 3,725,277; 3,725,480; 3,726,882; 3,736,357; 3,751,365; 3,756,953; 3,793,202; 3,798,165; 3,798,247; 3,803,039; 3,872,019; 3,904,595; 3,957,746; 3,980,569; 3,985,802; 4,006,089; 4,011,380; 4,025,451; 4,058,468; 4,083,699; 4,090,854; 4,354,950; and 4,485,023.

The preferred hydrocarbon sources for preparation of the Mannich polyamine dispersants are those derived from substantially saturated petroleum fractions and olefin polymers, preferably polymers of mono-olefins having from 2 to about 6 carbon atoms. The hydrocarbon source generally contains at least about 40 and preferably at least about 50 carbon atoms to provide substantial oil solubility to the dispersant. The olefin polymers having a GPC number average molecular weight between about 600 and 5,000 are preferred for reasons of easy reactivity and low cost. However, polymers of higher molecular weight can also be used. Especially suitable hydrocarbon sources are isobutylene polymers.

The preferred Mannich base dispersants for this use are Mannich base ashless dispersants formed by condensing about one molar proportion of long chain hydrocarbon-substituted phenol with from about 1 to 2.5 moles of formaldehyde and from about 0.5 to 2 moles of polyalkylene polyamine.

Polymeric polyamine dispersants suitable for preparing phosphorylated and/or boronated ashless dispersants are polymers containing basic amine groups and oil solubilizing groups (for example, pendant alkyl groups having at least about 8 carbon atoms). Such materials are illustrated by interpolymers formed from various monomers such as decyl methacrylate, vinyl decyl ether or relatively high molecular weight olefins, with aminoalkyl acrylates and aminoalkyl acrylamides. Examples of polymeric polyamine dispersants are set forth in U.S. Pat. Nos. 3,329,658; 3,449,250; 3,493,520; 3,519,565; 3,666,730; 3,687,849; and 3,702,300.

The various types of ashless dispersants described above can be phosphorylated by procedures described in U.S. Pat. Nos. 3,184,411; 3,342,735; 3,403,102; 3,502,607; 3,511,780; 3,513,093; 3,513,093; 4,615,826; 4,648,980; 4,857,214 and 5,198,133.

Methods that can be used for boronating (borating) the various types of ashless dispersants described above are described in U.S. Pat. Nos. 3,087,936; 3,254,025; 3,281,428; 3,282,955; 2,284,409; 2,284,410; 3,338,832; 3,344,069; 3,533,945; 3,658,836; 3,703,536; 3,718,663; 4,455,243; and 4,652,387.

Preferred procedures for phosphorylating and boronating ashless dispersants such as those referred to above are set forth in U.S. Pat. Nos. 4,857,214 and 5,198,133.

Various other additive components can be present in the compositions of this invention in order to provide additional desirable properties engendered by use of such additives. Thus any additive can be included so long as (a) it is compatible with and soluble or at least capable of existing as a shelf-stable dispersion in the finished liquid compositions of this invention, (b) it does not contribute to the presence of more than 100 ppm of metal in the finished oleaginous liquid composition, and (c) it does not adversely affect the viscometrics or stability needed in the finished functional fluid composition or otherwise materially adversely impair the performance of the finished composition.

Described below are illustrative examples of other types of additives that may be employed in the automatic transmission fluids of this invention.

Seal performance (elastomer compatibility) improvers such as dialkyl diesters typified by (a) the adipates, azelates, and sebacates of $C_8$–$C_{13}$ alkanols (or mixtures thereof), and (b) the phthalates of $C_4$–$C_{13}$ alkanols (or mixtures thereof), or combinations of (a) and (b) can be used. Examples of such materials include the n-octyl, 2-ethylhexyl, isodecyl, and tridecyl diesters of adipic acid, azelaic acid, and sebacic acid, and the n-butyl, isobutyl, pentyl, hexyl, heptyl, octyl, nonyl, decyl, undecyl, dodecyl, and tridecyl diesters of phthalic acid. Also useful are aromatic hydrocarbons of suitable viscosity such as Panasol AN-3N; products such as Lubrizol 730; polyol esters such as Emery 2935, 2936, and 2939 esters from the Emery Group of Henkel Corporation and Hatcol 2352, 2962, 2925, 2938, 2939, 2970, 3178, and 4322 polyol esters from Hatco Corporation.

The compositions may contain one or more antioxidants, e.g., one or more phenolic antioxidants, aromatic amine antioxidants, sulphurized phenolic antioxidants, and organic phosphites, among others. Examples include 2,6-di-tert-butylphenol, liquid mixtures of tertiary butylated phenols, 2,6-di-tert-butyl-4-methylphenol, 4,4'-methylenebis(2,6-di-tert-butylphenol), 2,2'-methylenebis(4-methyl-6-tert-butylphenol), mixed methylene-bridged polyalkyl phenols, 4,4'-thiobis(2-methyl-6-tert-butylphenol), N,N'-di-sec-butyl-p-phenylenediamine, 4-isopropylaminodiphenyl amine, phenyl-$\alpha$-naphthyl amine, and phenyl-$\beta$-naphthyl amine.

Corrosion inhibitors comprise another type of additive that can be used in the finished additive compositions and oils. Examples include dimer and trimer acids, such as are produced from tall oil fatty acids, oleic acid, linoleic acid, or the like. Products of this type include the dimer and trimer acids sold under the HYSTRENE trademark by the Humco Chemical Division of Witco Chemical Corporation and under the EMPOL trademark by Emery Chemicals. Other useful corrosion inhibitors include the alkenyl succinic acid and alkenyl succinic anhydride corrosion inhibitors such as, for example, tetrapropenylsuccinic acid, tetrapropenylsuccinic anhydride, tetradecenylsuccinic acid, tetradecenylsuccinic anhydride, hexadecenylsuccinic acid, hexadecenylsuccinic anhydride, and the like. Also useful are the half esters of alkenyl succinic acids having 8 to 24 carbon atoms in the alkenyl group with alcohols such as the polyglycols. Other suitable corrosion inhibitors include acid phosphates; polyethoxylated compounds such as ethoxylated amines, ethoxylated phenols, and ethoxylated alcohols; imidazolines; aminosuccinic acids or derivatives thereof, and the like.

Foam inhibitors likewise can be used in the finished oils and additive compositions of this invention. These include silicones, polyacrylates, surfactants, and the like.

Copper corrosion inhibitors constitute another class of additives which can be employed in the compositions of this invention. Such compounds include thiazoles, triazoles and thiadiazoles. Examples of such compounds include benzotriazole, tolyltriazole, octyltriazole, decyltriazole, dodecyltriazole, 2-mercapto benzothiazole, 2,5-dimercapto-1,3,4-thiadiazole, 2-mercapto-5-hydrocarbyl-thio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-bis-(hydrocarbyldithio)-1,3,4-thiadiazoles.

Supplementary friction modifiers possibly can be used, but extreme care should be exercised in evaluating proposed candidates for such supplemental use to be certain that the candidate material(s) will not interfere adversely with the excellent frictional properties afforded by the friction modifier system of this invention that is being used in any given situation. Candidate materials that may be tested for suitability as supplemental friction modifiers for use in the practice of this invention include aliphatic fatty acid amides, aliphatic carboxylic acids, aliphatic carboxylic esters, aliphatic carboxylic ester-amides, aliphatic phosphonates, aliphatic phosphates, aliphatic thiophosphonates, aliphatic thiophosphates, etc., wherein the aliphatic group usually contains above about eight carbon atoms so as to render the compound suitably oil soluble. As pointed out above, the compositions of this invention do not contain tertiary amine friction modifier components or aliphatic substituted succinimides formed by reacting one or more aliphatic succinic acids or anhydrides with ammonia. Likewise, any other friction modifier (or other additive component) that appreciably detracts from the performance of the herein-described combinations of components (i) and (ii) or otherwise renders the composition unsuitable for achieving the desired performance criteria must not be included, at least in amounts that give rise to either or both of such adverse results.

Metal-containing detergents such as calcium sulfurized phenates, magnesium sulfurized phenates, calcium sulfonates, magnesium sulfonates, etc. can also be used. However, as noted above, if an oil-soluble or oil-dispersible phenate or sulfonate is used it should be proportioned such that the finished fluid contains no more than about 100 ppm of metal, and preferably no more than about 50 ppm of metal.

Ashless dispersants can be used either in lieu of or in addition to the preferred phosphorylated ashless dispersants, preferred boronated ashless dispersants and/or particularly preferred phosphorylated and boronated ashless dispersants described hereinabove. Useful oil-soluble ashless dispersants when neither phosphorylated nor boronated that can be used if desired include those non-phosphorylated and non-boronated ashless dispersants referred to in U.S. Pat. Nos. 2,459,112; 2,962,442; 2,984,550; 3,036,003; 3,166,516; 3,172,892; 3,184,474; 3,202,678; 3,216,936; 3,219,666; 3,236,770; 3,254,025; 3,272,746; 3,275,554; 3,329,658; 3,331,776; 3,368,972; 3,381,022; 3,394,576; 3,413,347; 3,438,757; 3,442,808; 3,448,047; 3,449,250; 3,454,497; 3,454,555; 3,459,661; 3,493,520; 3,519,565; 3,522,179; 3,539,633; 3,558,743; 3,565,804; 3,576,743; 3,586,629; 3,591,598; 3,600,372; 3,632,511; 3,634,515; 3,649,229; 3,666,730; 3,671,511; 3,687,849; 3,697,574; 3,702,300; 3,703,536; 3,704,308; 3,725,277; 3,725,480; 3,726,882; 3,736,357; 3,751,365; 3,756,953; 3,793,202; 3,798,165; 3,798,247;

3,803,039; 3,804,763; 3,821,302; 3,836,471; 3,862,981; 3,872,019; 3,904,595; 3,936,480; 3,948,800; 3,950,341; 3,957,746; 3,957,854; 3,957,855; 3,980,569; 3,985,802; 3,991,098; 4,006,089; 4,011,380; 4,025,451; 4,058,468; 4,071,548; 4,083,699; 4,090,854; 4,173,540; 4,234,435; 4,354,950; and 4,485,023.

Still other components that can be present include lubricity agents such as sulfurized fats, sulfurized isobutylene, dialkyl polysulfides, and sulfur-bridged phenols such as nonylphenol polysulfide. Dyes, pour point depressants, viscosity index improvers, air release agents, and other known types of additives can also be included in the finished compositions.

In selecting any of the foregoing optional additives, it is important to ensure that the selected component(s) is/are soluble or stably dispersible in the additive package and finished ATF composition, are compatible with the other components of the composition, and do not interfere significantly with the performance properties of the composition, such as the friction, viscosity and/or shear stability properties, needed or at least desired in the overall finished composition.

In general, the ancillary additive components are employed in the oils in minor amounts sufficient to improve the performance characteristics and properties of the base fluid. The amounts will thus vary in accordance with such factors as the viscosity characteristics of the base fluid employed, the viscosity characteristics desired in the finished fluid, the service conditions for which the finished fluid is intended, and the performance characteristics desired in the finished fluid. However, generally speaking, the following concentrations (weight percent) of the additional components (active ingredients) in the base fluids are illustrative:

|  | Typical Range | Preferred Range |
| --- | --- | --- |
| P- and/or B-containing dispersant | 0.2–15 | 0.5–5 |
| Seal performance improver | 0–30 | 0–20 |
| Antioxidant | 0–1 | 0.25–1 |
| Corrosion inhibitor | 0–0.5 | 0.01–0.1 |
| Foam inhibitor | 0–0.01 | 0.0001–0.005 |
| Copper corrosion inhibitor | 0–0.5 | 0.01–0.05 |
| Additional friction modifier(s) | 0–1 | 0.05–0.5 |
| Lubricity agent | 0–1.5 | 0.5–1 |
| Viscosity index improver | 0–15 | 0–12 |
| Dye | 0–0.05 | 0.015–0.035 |

It is to be clearly understood that the foregoing description of additives which can be present in the oils and concentrations in which they may be present, is not under any circumstances to be construed as imposing, by implication or otherwise, any limitation on the composition or type of lubricating oil or functional fluid composition that may be employed in the practice of this invention. This description is merely being presented to forestall hypertechnical interpretations of the "best mode" or "enablement" requirements of the current U.S. patent statute. The chief requirements as regards the compositions are that the finished oil must be formulated to be suitable for use as an ATF, and must contain components (i) and (ii) in suitable amounts referred to herein so that the resultant ATF exhibits improved friction performance.

Illustrative compositions suitable for use in the practice of this invention are presented in the following Examples 1–6 wherein all parts and percentages are by weight. Component (i) is bis(2-hydroxyethyl) tallow amine, and component (ii) is N-oleyl-trimethylene diamine. Comparative Examples A and B contain component (i) but do not contain component (ii).

The phosphorylated and boronated ashless dispersant used in the examples is a polyisobutenyl succinimide formed substantially as described in Example 1A of U.S. Pat. No. 4,857,214. The succinimide used for making this phosphorylated and boronated polyisobutenyl succinimide has an acylating agent:polyamine mol ratio of approximately 2:1. HITEC ® 314 Additive is included as a copper corrosion inhibitor. The antifoam agent is a dimethyl silicone oil employed as a 4% solution in diluent oil.

Various proprietary additive components are also employed in the examples. These are:

SUL-PERM 10S, available from the Keil Chemical Division of Ferro Corporation, is reported to be a sulfurized fatty ester having a sulfur content of about 10% by weight.

SUL-PERM 307, available from the Keil Chemical Division of Ferro Corporation, is reported to be a sulfurized fatty material having a sulfur content of about 6% by weight, and produced according to U.S. Pat. No. 4,380,499. It is indicated to be a friction modifier.

Naugalube 438L, available from Uniroyal Chemical Company, is reported to be a nonylated diphenyl amine antioxidant, containing predominantly 4,4'-dinonylated diphenylamine.

OLOA 216C available from Chevron Chemical Company, Oronite Division, is reported to be a calcium hydroxide salt of a sulfurized alkylphenate having a nominal TBN of about 150.

PC-1244, available from Monsanto Chemical Company as M544, is reported to be primarily an acrylate polymer surfactant.

Mazawet 77, available from Mazer Chemical Company, is reported to be alkyl polyoxyalkylene ether.

Tomah PA-14, available from Exxon Chemical Company, is reported to be 3-decyloxypropylamine.

Pluronic L-81, available from BASF Corporation, is reported to be a polyoxypropylene-polyoxyethylene block copolymer.

Acryloid 1263, available from Rohm & Haas Company, is reported to be a polymethacrylate ester copolymer viscosity index improver.

Viscoplex 5548, available from Röhm GmbH Chmische Fabrik, is reported to be a polymethocrylate ester copolymer viscosity index improver.

The base oils used are mineral oils or mineral oil blends suitable for forming ATFs.

EXAMPLE 1

| Components | % |
| --- | --- |
| Component (i) | 0.150 |
| Component (ii) | 0.005 |
| Phosphorylated and boronated ashless dispersant | 3.770 |
| Sul-Perm 307 | 0.800 |
| HITEC ® 314 Additive | 0.040 |
| Antifoam agent | 0.020 |
| Naugalube 438L | 0.260 |
| OLOA 216C | 0.050 |
| Octanoic acid | 0.050 |
| Tomah PA-14 | 0.050 |
| Pluronic L-81 | 0.010 |
| Mazawet 77 | 0.050 |
| PC 1244 | 0.030 |
| Diluent oil | 0.265 |
| Viscoplex 5548 | 5.800 |
| Red dye | 0.025 |

-continued

| Components | % |
|---|---|
| Mineral oil (LA3362) | 88.625 |

EXAMPLE 2

| Components | % |
|---|---|
| Component (i) | 0.150 |
| Component (ii) | 0.010 |
| Phosphorylated and boronated ashless dispersant | 3.770 |
| HITEC ® 314 Additive | 0.040 |
| Antifoam agent | 0.060 |
| Naugalube 438L | 0.260 |
| OLOA 216C | 0.050 |
| Octanoic acid | 0.050 |
| Tomah PA-14 | 0.050 |
| Pluronic L-81 | 0.010 |
| Mazawet 77 | 0.050 |
| PC 1244 | 0.030 |
| Diluent oil | 0.260 |
| Viscoplex 5548 | 5.799 |
| Red dye | 0.025 |
| Mineral oil (LA3362) | 88.586 |

EXAMPLE 3

| Components | % |
|---|---|
| Component (i) | 0.150 |
| Component (ii) | 0.010 |
| Phosphorylated and boronated ashless dispersant | 3.771 |
| Sul-Perm 10S | 0.480 |
| HITEC ® 314 Additive | 0.040 |
| Antifoam agent | 0.020 |
| Naugalube 438L | 0.261 |
| OLOA 216C | 0.050 |
| Octanoic acid | 0.050 |
| Tomah PA-14 | 0.050 |
| Pluronic L-81 | 0.010 |
| Mazawet 77 | 0.050 |
| PC 1244 | 0.030 |
| Acryloid 1263 | 5.800 |
| Red dye | 0.025 |
| Mineral oil (FN1391) | 87.975 |
| Mineral oil (PetroCanada 45N) | 1.228 |

EXAMPLE 4

| Components | % |
|---|---|
| Component (i) | 0.150 |
| Component (ii) | 0.020 |
| Phosphorylated and boronated ashless dispersant | 3.770 |
| Sul-Perm 307 | 0.800 |
| HITEC ® 314 Additive | 0.040 |
| Antifoam agent | 0.060 |
| Naugalube 438L | 0.260 |
| OLOA 216C | 0.050 |
| Octanoic acid | 0.050 |
| Tomah PA-14 | 0.050 |
| Pluronic L-81 | 0.010 |
| Mazawet 77 | 0.050 |
| PC 1244 | 0.030 |
| Diluent oil | 0.260 |
| Viscoplex 5548 | 5.799 |
| Red dye | 0.025 |
| Mineral oil (LA3362) | 88.576 |

EXAMPLE 5

| Components | % |
|---|---|
| Component (i) | 0.150 |
| Component (ii) | 0.020 |
| Phosphorylated and boronated ashless dispersant | 3.771 |
| HITEC ® 314 Additive | 0.040 |
| Antifoam agent | 0.020 |
| Naugalube 438L | 0.261 |
| OLOA 216C | 0.050 |
| Octanoic acid | 0.050 |
| Tomah PA-14 | 0.050 |
| Pluronic L-81 | 0.010 |
| Mazawet 77 | 0.050 |
| PC 1244 | 0.030 |
| Acryloid 1263 | 5.800 |
| Red dye | 0.025 |
| Mineral oil (FN1391) | 87.975 |
| Mineral oil (PetroCanada 45N) | 1.698 |

EXAMPLE 6

| Components | % |
|---|---|
| Component (i) | 0.150 |
| Component (ii) | 0.020 |
| Phosphorylated and boronated ashless dispersant | 3.771 |
| Sul-Perm 10S | 0.480 |
| HITEC ® 314 Additive | 0.040 |
| Antifoam agent | 0.020 |
| Naugalube 438L | 0.261 |
| OLOA 216C | 0.050 |
| Octanoic acid | 0.050 |
| Tomah PA-14 | 0.050 |
| Pluronic L-81 | 0.010 |
| Mazawet 77 | 0.050 |
| PC 1244 | 0.050 |
| Acryloid 1263 | 5.800 |
| Red dye | 0.025 |
| Mineral oil (FN1391) | 87.975 |
| Mineral oil (PetroCanada 45N) | 1.218 |

Comparative Example A

| Components | % |
|---|---|
| Component (i) | 0.150 |
| Component (ii) | None |
| Phosphorylated and boronated ashless dispersant | 3.770 |
| Sul-Perm 307 | 0.800 |
| HITEC ® 314 Additive | 0.040 |
| Antifoam agent | 0.060 |
| Naugalube 438L | 0.260 |
| OLOA 216C | 0.050 |
| Octanoic acid | 0.050 |
| Tomah PA-14 | 0.050 |
| Pluronic L-81 | 0.010 |
| Mazawet 77 | 0.050 |
| PC 1244 | 0.030 |
| Diluent oil | 0.260 |
| Viscoplex 5548 | 5.800 |
| Red dye | 0.025 |
| Mineral oil (LA3362) | 88.595 |

Comparative Example B

| Components | % |
|---|---|
| Component (i) | 0.150 |
| Component (ii) | None |
| Phosphorylated and boronated ashless dispersant | 3.771 |
| Sul-Perm 10S | 0.480 |
| HITEC ® 314 Additive | 0.040 |
| Antifoam agent | 0.060 |

-continued

| Components | % |
| --- | --- |
| Naugalube 438L | 0.261 |
| OLOA 216C | 0.050 |
| Octanoic acid | 0.050 |
| Tomah PA-14 | 0.050 |
| Pluronic L-81 | 0.010 |
| Mazawet 77 | 0.050 |
| PC 1244 | 0.030 |
| Acryloid 1263 | 5.800 |
| Red dye | 0.025 |
| Mineral oil (FN1391) | 87.975 |
| Mineral oil (PetroCanada 45N) | 1.198 |

Figure 1:
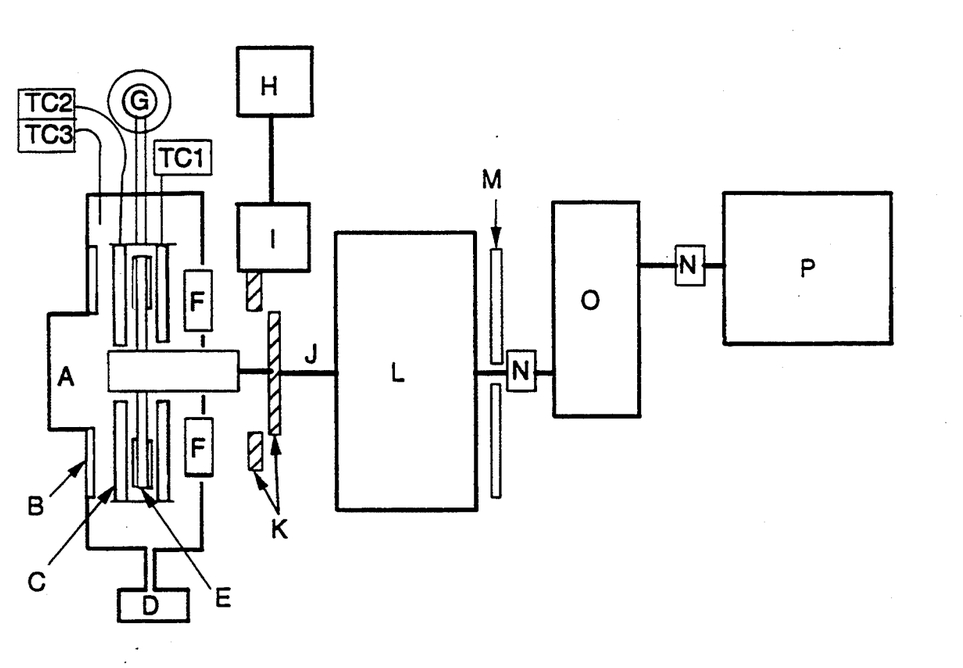
The FIGURE depicts schematically a modified SAE No. 2 machine used in test work referred to hereinafter.

The beneficial results on minimization or elimination of shudder achievable by the practice of this invention are illustrated by the results of a series of tests conducted under carefully controlled conditions and in which measurements were made of coefficients of friction at low speeds. The test procedure utilized an SAE No. 2 machine modified to enable measurement of the coefficient of friction as a function of sliding speed. The Figure depicts in schematic fashion the modified SAE No. 2 machine used. The parts of the machine as labelled in the Figure are identified in Table I.

TABLE I

| Legend | Part Description |
| --- | --- |
| A | Clutch Pack Housing |
| B | Spacer - Inside Housing |
| C | Steel Clutch Plates (Steel Separators) |
| D | Test ATF Reservoir/Temperature Control Unit |
| E | Friction Disk |
| F | Air Piston |
| G | Load Cell (Strain Gauge) |
| H | AC Motor (Static Motor): 1.5 KW |
| I | Speed Reducer |
| J | Motor Shaft Extension |
| K | Worm Gear |
| L | 3600 RPM AC Motor: 22.37 KW |
| M | Flywheel (Removable) |
| N | Shaft Coupling |
| O | Speed Reducer |
| P | Variable Speed DC Motor: 11.2 KW |
| TC1 | Thermocouple (Steel Plate Temperature) |
| TC2 | Thermocouple (Steel Plate Temperature) |
| TC3 | Thermocouple (Oil Temperature |

In the Figure, Parts A through M are in a conventional SAE No. 2 machine. Parts N through P represent the modifications enabling the evaluation of shudder under low speed operation. Thus a conventional SAE No. 2 machine is equipped with a 3600 rpm motor L with shaft extensions on both ends. The inertia end is flanged to a flywheel M to provide the desired total energy for each dynamic engagement. The clutch end extends into the test head where it is adapted to drive the splined hub for the clutch. The head is supported on the shaft through bearings to allow rotation independent of the shaft. Another small motor H is used for the measurement of static breakaway coefficient of friction ($\mu_s$) at very low speed (typically less than 5 rpm). Frictional force is measured through a load cell G at a given temperature, load, and sliding speed. The load is applied by means of a pneumatic piston F.

The CSTCC shudder evaluation requires the measurement of the coefficient of friction ($\mu$) at low sliding speed under well-controlled temperature and load conditions. Since neither of the two AC motors, L and H, have enough torque for this purpose, a variable speed DC motor P and speed reducer O capable of producing 300N m torque at 1 rpm were attached to the machine via a shaft coupling connected through the de-energized 3600 rpm Dynamic Motor L.

The dimensions of the friction disk, loaded between two steel plates, are shown in Table II. Borg Warner SD-1777 friction material was used in this series of tests.

TABLE II

| Material | Paper-Type (SD-1777) |
| --- | --- |
| Groove | None |
| Inner Diameter (Di) | 10.2 cm |
| Outer Diameter (Do) | 12.7 cm |
| Effective Mean Radius (Rm) | 5.7 cm |
| Gross Area [per side] ($A_G$) | 44.9 cm$^2$ |

Commercial steel separator plates were used as the mating plates. Each of the two steel plates was drilled radially with 0.58 mm holes with an outer edge chamfered. A type J thermocouple was inserted in each plate so that the tip of the thermocouple was positioned at the center of the friction contact area. Steel plates were cleaned with heptane and wiped with gauze. Plates were assembled in the SAE No. 2 head with the rotating friction disk located between the fixed steel plates (Note the Figure). The test ATF (700 mL) was charged into the head assembly. This was followed by a one-hour soak period at room temperature before the test was started.

The friction coefficient in the speed range of zero to two meters per second is highly dependent on the temperature. In the test procedure used, three temperatures are carefully monitored: the temperatures of the two steel plates by means of TC1 and TC2, and the temperature of the test ATF by means of TC3 (Note the Figure). All of the temperatures are measured with type "J" thermocouples.

After the new clutch plates have been soaked in the test ATF for one hour, a break-in procedure is to stabilize the frictional characteristics of the paper clutch plate. Break-in conditions can vary depending on the kind of friction material used (among other factors). Therefore, the break-in conditions used for these tests are shown in Table IIIA. Surface pressure on the clutch plates is calculated from the pressure applied to the piston of the SAE No. 2 machine using the following equation:

$$P_P \times A_P = P_D \times A_G \qquad (1)$$

Where, $P_P$: Apply pressure (Pressure applied to the SAE No. 2 apply piston to generate the axial apply force)
$A_P$: Area of apply piston (151.1 Cm$^2$)
$P_D$: Surface pressure on the clutch plates
$A_G$: Gross area of friction material [per side] (44.9 cm$^2$)

TABLE IIIA

| Apply Pressure | 291 kPa |
| --- | --- |
| (Surface Pressure) | (980 kPA) |
| Sliding Speed | 100 rpm |
| Oil Temperature | 100° C. |
| Duration | 30 min. |

In an actual CSTCC unit, the surface pressure of the lock-up clutch is modulated to maintain constant output torque. Also, higher surface pressure may be locally applied due to the possible distortion of the steel or friction surfaces. Therefore, data was taken at three different surface pressures. The rotating speeds of rpm and 300 rpm correspond to linear sliding speeds of 0.6 cm/second and 180 cm/second, respectively. Since the coefficient of friction varies with temperature (it especially depends on the interface temperature), each coefficient of friction is measured 0.3 seconds after the start of the engagement except for data taken at 1 rpm where the measurement period is 2.9 seconds after engagement to ensure the achievement of stable torque values. The temperature rise during the 2.9-second engagement is negligible in this low speed. Between the collection of each data point, the clutch is disengaged and rotated at 100 rpm for four minutes to allow the system to thermally equilibrate to set temperature (40° C. or 120° C.).

Coefficients of friction are calculated based on the following equation:

$$\mu = \frac{T}{P_p \cdot A_p \cdot Rm \cdot n} \quad (2)$$

Where,
T: Torque (N.m)
$P_P$: Apply pressure (Pressure applied to the SAE No. 2 apply piston) (kPa)
$P_P$: Area of apply piston (m$^2$)
Rm: Effective mean radius of friction disks
n: Number of friction plate surfaces (=2)

To obtain a valid prediction of vehicle shudder performance before break-in, the tests must start with new friction materials. This enables friction determinations to be made both before and after break-in of the friction materials. The test conditions used in the operation of the modified SAE No. 2 machine are summarized in Table IIIB.

TABLE IIIB

| | |
|---|---|
| Friction Material | SD-1777 |
| Clutch Plate Arrangement | S-F-S* |
| Oil Temperature | 120° C. |
| Apply Pressure (Surface Pressure) | 233 kPa (780 kPa) |
| Sliding Speed | 1, 2, 5, 10, 20, 30, 40, 50, 75, 100, 150, 200, 250, 300 rpm |
| Test Fluid Volume | 700 mL (no circulation) |
| Duration | 3 seconds at each sliding speed |

S* — Steel plate, F: Friction Disk

Studies have shown that good correlations in results are achieved as between actual CSTTCs and the above test procedure using the modified SAE No. 2 machine provided that two ratios are used. These ratios are $\mu_1/\mu_{50}$ and $\mu_{100}/\mu_{300}$. $\mu_1/\mu_{50}$ is the ratio of coefficient of friction at 1 rpm (0.6 cm/second) and at 50 rpm (30 cm/second). $\mu_{100}/\mu_{300}$ is the ratio of coefficient of friction at 100 rpm (60 cm/second) and at 300 rpm (180 cm/second). Correlation of OEM test results on CSTCCs with results obtained using the modified SAE No. 2 machine described above have shown that the foregoing ratios enable accurate evaluation of shudder performance of an ATF provided fresh friction plates are used and the data for developing the foregoing ratios are obtained both with the new plates (i.e., before break-in) and after break-in.

Thus in this test procedure the ratios of $\mu_1$ to $\mu_{50}$ and of $\mu_{100}$ to $\mu_{300}$ both before and after break-in must be less than 0.9 and no more than 1.02, respectively. To achieve these respective values with new plates (i.e., before break-in) has heretofore proven to be extremely difficult. Even ATFs generally recognized in the industry to be the best available in the marketplace cannot achieve these results.

Tables IV and V summarize the data obtained in these tests.

TABLE IV

| | $\mu_1/\mu_{50}$ Ratios Before and After Break-In | |
|---|---|---|
| Example | $\mu_1/\mu_{50}$ Before Break-In | $\mu_1/\mu_{50}$ After Break-In |
| 1 | 0.846 | 0.782 |
| 2 | 0.763 | 0.711 |
| 3 | 0.781 | 0.714 |
| 4 | 0.870 | 0.659 |
| 5 | 0.669 | 0.626 |
| 6 | 0.617 | 0.602 |
| A | 0.980 | 0.872 |
| B | 0.919 | 0.803 |

Table V

| | $\mu_{100}/\mu_{300}$ Ratios Before and After Break-In | |
|---|---|---|
| Example | $\mu_{001}/\mu_{300}$ Before Break-In | $\mu_{100}/\mu_{300}$ After Break-In |
| 1 | 1.000 | 1.000 |
| 2 | 0.991 | 1.000 |
| 3 | 1.000 | 0.979 |
| 4 | 1.000 | 1.000 |
| 5 | 0.976 | 0.978 |
| 6 | 0.976 | 0.986 |
| A | 1.042 | 1.000 |
| B | 1.042 | 1.000 |

The compositions of this invention also have the ability to maintain a substantially constant ratio between (i) the low speed dynamic coefficient of friction ($\mu_0$) of periodically-engageable automatic transmission friction surfaces, and (ii) the (midpoint) dynamic coefficient of friction ($\mu_d$) of such friction surfaces. This was demonstrated in a series of tests in which the ATFs of Examples 1-6 and Comparative Examples A and B were subjected to a standard test using a conventional SAE No. 2 machine. In this test, the motor and flywheel of the friction machine (filled with fluid to be tested) are accelerated to constant speed, the motor is shut off and the flywheel speed is decreased to zero by application of the clutch. The clutch plates are then released, the flywheel is again accelerated to constant speed, and the clutch pack which is immersed in the test fluid is engaged again. This process is repeated many times with each clutch engagement being called a cycle.

During the clutch application, friction torque is recorded as a function of time. The friction data obtained are either the torque traces themselves or friction coefficients calculated from the torque traces. The shape of the torque trace desired is set by the auto manufacturers. One way of expressing this shape mathematically, is to determine the coefficient of friction (a) when the flywheel speed is midway between the maximum constant speed selected and zero speed (such coefficient of friction measurement is referred to herein as (midpoint) dynamic coefficient of friction ($\mu_d$)) and (b) when as the flywheel speed approaches zero rpm (such coefficient of friction measurement is referred to herein as low speed dynamic coefficient of friction ($\mu_0$)). Such coefficient of friction can then be used to determine the so-called "static to dynamic ratio" or "rooster tail" which is expressed as $\mu_0/\mu_d$ in which case the typical optimum value thereof is about 1. As the $\mu_0/\mu_d$ increasingly exceeds 1, a transmission will typically exhibit shorter, harsher shifts as it changes gears. On the other hand, as $\mu_0\mu_d$ decreases below 1, there is an increasingly greater danger of clutch slippage when the transmission changes gears.

While a number of ATFs can achieve a $\mu_o/\mu_d$ target value of 1 (or very close thereto), after a certain number of cycles it becomes increasingly more difficult to sustain this target value as the number of cycles is increased. The ability of an ATF to sustain such desired friction properties is its friction durability. Thus the greater the friction durability of an ATF, the better.

The specific conditions for the Japanese friction test used in the present test work are shown in Table VI.

Table VI

| Japanese Friction Test Conditions | |
| --- | --- |
| Test Variable | Value |
| Friction Material | SD-1777X |
| Number of Friction Plates | 3 |
| Clutch Plate Arrangement | S-F-S-F-S-F-S* |
| Test Temperature | 100° C. |
| Energy | 24400 J |
| Motor Speed for Dynamic Test | 3600 rpm |
| Motor Speed for Static Test | 0.72 rpm |
| Apply Pressure to the Piston | 235 kPa |
| Test Duration | 5000 cycles |

*S:Steel plate; F:Friction plate.

The results of these friction tests to evaluate "static to dynamic ratio" or "rooster tail" durability are summarized in Table VII.

TABLE VII

| | Friction Durability Test Results | | |
| --- | --- | --- | --- |
| Example | $\mu_o/\mu_d$; 500 Cycles | $\mu_o/\mu_d$; 5000 Cycles | Change in $\mu_o/\mu_d$ |
| 1 | 1.012 | 0.996 | −0.016 |
| 2 | 1.013 | 0.998 | −0.015 |
| 3 | 1.013 | 0.994 | −0.019 |
| 4 | 1.011 | 0.998 | −0.013 |
| 5 | 1.002 | 1.009 | +0.007 |
| 6 | 1.012 | 1.000 | −0.012 |
| A | 1.039 | 0.990 | −0.049 |
| B | 1.023 | 1.007 | −0.016 |

The beneficial friction characteristics made available by the practice of this invention were also exhibited by ATF compositions similar to those referred to in Examples 1–6 wherein the ATF contained 0.15 weight percent of (i) and 0.0025 weight percent of (ii) whereby the ratio of (i) to (ii) was 60:1, and wherein the ATF contained 0.15 weight percent of (i) and 0.0017 weight percent of (ii) whereby the ratio of (i) to (ii) was 88:1.

As used in the foregoing description, the term "oil-soluble" is used in the sense that the component in question has sufficient solubility in the selected base oil in order to dissolve therein at ordinary temperatures to a concentration at least equivalent to the minimum concentration required to achieve the results or effect for which the additive is used. Preferably, however, the solubility of such component in the selected base oil will be in excess of such minimum concentration, although there is no requirement that the component be soluble in the base oil in all proportions. Certain useful additives do not completely dissolve in base oils but rather are used in the form of stable suspensions or dispersions in the oil. Oils containing such dispersed additives of can also be employed in the practice of this invention provided such additives do not significantly interfere with the performance or usefulness of the composition in which they are employed. Given a choice, it is preferable to use any oil in which all components thereof are oil-soluble, but this is not a requirement in the practice of this invention.

The complete disclosure of each U.S. Patent cited anywhere hereinabove is incorporated herein by reference as if fully set forth in this specification.

It will be readily apparent that this invention is susceptible to considerable modification in its practice. Accordingly, this invention is not intended to be limited by the specific exemplifications presented hereinabove. Rather, what is intended to be covered is within the spirit and scope of the appended claims.

We claim:

1. An automatic transmission fluid which has a friction modifier content, said automatic transmission fluid being characterized in that:
   a) the friction modifier content of said automatic transmission fluid consists essentially of (i) an N-aliphatic hydrocarbyl-substituted diethanolamine in which the N-aliphatic hydrocarbyl-substituted is at least one straight chain aliphatic hydrocarbyl group free of acetylenic unsaturation and having in the range of 14 to 20 carbon atoms, and (ii) an N-aliphatic hydrocarbyl-substituted trimethylenediamine in which the N-aliphatic hydrocarbyl-substituent is at least one straight chain aliphatic hydrocarbyl group free of acetylenic unsaturation and having in the range of about 14 to about 20 carbon atoms;
   b) the friction modifier is devoid of any tertiary amine friction modifier component and any $C_{12-36}$ aliphatic hydrocarbyl succinimide or succinamide;
   c) the relative proportions of (i) to (ii) are such that there are from about 7 to about 340 parts by weight of (i) per part by weight of (ii); and
   d) the automatic transmission fluid contains 0.08 to 0.17 wt % of (i) and 0.0005 to 0.02 wt % of (ii) proportioned as in c) hereof.

2. An automatic transmission fluid in accordance with claim 1 wherein (i) is N-tallow diethanolamine and (ii) is N-oleyl-trimethylene diamine.

3. An automatic transmission fluid in accordance with claim 1 wherein the automatic transmission fluid contains about 0.15 wt of (i) and 0.001 to 0.02 wt % of (ii).

4. An automatic transmission fluid in accordance with claim 1 wherein said fluid has a kinematic viscosity of at least 6.8 cSt at 100° C. and a Brookfield viscosity of not more than 20,000 cP at −40° C.

5. An automatic transmission fluid in accordance with claim 3 wherein (i) is N-tallow diethanolamine and (ii) is N-oleyl-trimethylene diamine.

6. An automatic transmission fluid in accordance with claim 3 wherein said fluid has a kinematic viscosity of at least 6.8 Cst at 100° C. and a Brookfield viscosity of not more than 20,000 cP at −40° C.

7. An automatic transmission fluid in accordance with claim 4 wherein (i) is N-tallow diethanolamine and (ii) is N-oleyl-trimethylene diamine.

8. An automatic transmission fluid in accordance with claim 1 wherein the automatic transmission fluid contains about 0.15 wt of (i) and 0.005 to 0.02 wt % of (ii); wherein (i) is N-tallow diethanolamine and (ii) is N-oleyl-trimethylene diamine; and wherein said fluid has a kinematic viscosity of at least 6.8 cSt at 100° C. and a Brookfield viscosity of not more than 20,000 cP at −40° C.

9. An automatic transmission fluid in accordance with claim 1 wherein the automatic transmission fluid contains about 0.15 wt of (i) and about 0.005 wt % of (ii); and wherein (i) is N-tallow diethanolamine and (ii) is N-oleyl-trimethylene diamine.

10. An automatic transmission fluid in accordance with claim 1 wherein the automatic transmission fluid contains about 0.15 wt of (i) and about 0.01 wt % of (ii); and wherein (i) is N-tallow diethanolamine and (ii) is N-oleyl-trimethylene diamine.

11. An automatic transmission fluid in accordance with claim 1 wherein the automatic transmission fluid contains about 0.15 wt of (i) and about 0.02 wt % of (ii); and wherein (i) is N-tallow diethanolamine and (ii) is N-oleyl-trimethylene diamine.

12. An automatic transmission fluid in accordance with claim 1 wherein the automatic transmission fluid contains about 0.15 wt of (i) and 0.002 to 0.02 wt % of (ii).

13. An automatic transmission fluid in accordance with claim 1 wherein the automatic transmission fluid contains about 0.15 wt % of (i) and 0.003 to 0.02 wt % of (ii).

14. A friction modifier composition consisting essentially of (i) an N-aliphatic hydrocarbyl-substituted diethanolamine in which the N-aliphatic hydrocarbyl-substituent is at least one straight chain aliphatic hydrocarbyl group free of acetylenic unsaturation and having in the range of 14 to 20 carbon atoms, and (ii) an N-aliphatic hydrocarbyl-substituted trimethylenediamine in which the N-aliphatic hydrocarbyl-substituent is at least one straight chain aliphatic hydrocarbyl group free of acetylenic unsaturation and having in the range of about 14 to about 20 carbon atoms wherein (a) the proportions of (i) and (ii) are such that there are from about 7 to about 340 parts by weight of (i) per part by weight of (ii), and (b) said friction modifier composition is devoid of any tertiary amine friction modifier component and any $C_{12-36}$ aliphatic hydrocarbyl succinimide or succinamide friction modifier.

15. A composition in accordance with claim 14 wherein there are from about 7.5 to about 30 parts by weight of (i) per part by weight of (ii).

16. A composition in accordance with claim 14 wherein (i) is N-tallow diethanolamine and (ii) is N-oleyl-trimethylene diamine.

17. A composition in accordance with claim 16 wherein there are about 7.5 to about 30 parts by weight of (i) per part by weight of (ii).

18. A composition in accordance with claim 16 wherein there are about 30 parts by weight of (i) per part by weight of (ii).

19. A composition in accordance with claim 16 wherein there are about 15 parts by weight of (i) per part by weight of (ii).

20. A composition in accordance with claim 14 wherein the proportions of (i) and (ii) are such that there are from about 7 to about 160 parts by weight of (i) per part by weight of (ii).

21. A composition in accordance with claim 14 wherein the proportions of (i) and (ii) are such that there are from about 7 to about 70 parts by weight of (i) per part by weight of (ii).

22. A method of reducing shudder in an automatic transmission having a continuous slip torque converter clutch which comprises contacting said clutch with an automatic transmission fluid which has a friction modifier content, said automatic transmission fluid being characterized in that:
  a) the friction modifier content of said automatic transmission fluid consists essentially of (i) an N-aliphatic hydrocarbyl-substituted diethanolamine in which the N-aliphatic hydrocarbyl-substituent is at least one straight chain aliphatic hydrocarbyl group free of acetylenic unsaturation and having in the range of 14 to 20 carbon atoms, and (ii) an N-aliphatic hydrocarbyl-substituted trimethylenediamine in which the N-aliphatic hydrocarbyl-substituent is at least one straight chain aliphatic hydrocarbyl group free of acetylenic unsaturation and having in the range of about 14 to about 20 carbon atoms;
  b) the friction modifier is devoid of any tertiary amine friction modifier component and any $C_{12-36}$ aliphatic hydrocarbyl succinimide or succinamide;
  c) the relative proportions of (i) to (ii) are such that there are from about 7 to about 340 parts by weight of (i) per part by weight of (ii); and
  d) the automatic transmission fluid contains 0.08 to 0.17 wt % of (i) and 0.0005 to 0.02 wt % of (ii) proportioned as in c) hereof.

23. A method in accordance with claim 22 wherein (i) is N-tallow diethanolamine and (ii) is N-oleyl-trimethylene diamine.

24. A method in accordance with claim 22 wherein there are from about 7 to about 160 parts by weight of (i) per part by weight of (ii).

25. A method in accordance with claim 22 wherein there are from about 7 to about 70 parts by weight of (i) per part by weight of (ii).

26. A method in accordance with claim 22 wherein there are from about 7 to about 40 parts by weight of (i) per part by weight of (ii).

27. A method in accordance with claim 22 wherein there are from about 15 to about 30 parts by weight of (i) per part by weight of (ii).

* * * * *